(12) United States Patent
Richter et al.

(10) Patent No.: US 12,732,284 B2
(45) Date of Patent: Sep. 8, 2026

(54) LOW-AMPLITUDE HIGH-PRECISION ULTRASONIC PULSER

(71) Applicant: Southwest Research Institute, San Antonio, TX (US)

(72) Inventors: Nathan Richter, San Antonio, TX (US); Jay Fisher, Alamo Heights, TX (US)

(73) Assignee: Southwest Research Institute, San Antonio, TX (US)

( * ) Notice: Subject to any disclaimer, the term of this patent is extended or adjusted under 35 U.S.C. 154(b) by 180 days.

(21) Appl. No.: 18/819,031

(22) Filed: Aug. 29, 2024

(65) Prior Publication Data

US 2025/0080242 A1 Mar. 6, 2025

Related U.S. Application Data

(60) Provisional application No. 63/580,364, filed on Sep. 2, 2023.

(51) Int. Cl.
*H04B 11/00* (2006.01)

(52) U.S. Cl.
CPC .................................... *H04B 11/00* (2013.01)

(58) Field of Classification Search
CPC ..................................................... H04B 11/00
See application file for complete search history.

(56) References Cited

U.S. PATENT DOCUMENTS

| | | | | |
|---|---|---|---|---|
| 3,786,405 A * | 1/1974 | Chramiec | G01S 15/89 | 367/901 |
| 2014/0043946 A1 * | 2/2014 | Youngquist | G06K 7/02 | 367/197 |

* cited by examiner

*Primary Examiner* — Krystine E Breier
(74) *Attorney, Agent, or Firm* — Livingston Law Firm

(57) ABSTRACT

A pulser/receiver for generating and receiving ultrasonic pulses in the form of chirps, for use by an ultrasonic transducer. The pulser has a transmit path having a direct digital synthesizer operable to generate a chirp signal; a converter operable to convert the chirp signal to a transmit signal having a single ended voltage, a voltage amplifier and a power amplifier. Switches deliver the transmit signal to the transducer in a transmit mode but isolate the transmit path in a receive mode. The transmit signal and the received signal are both delivered to a switch, which sends the transmit signal through an attenuator but bypasses the attenuator in receive mode. Both the attenuated transmit signal and the receive signal are then ready for arrival time processing by a matched filter.

5 Claims, 2 Drawing Sheets

LOW-AMPLITUDE HIGH-PRECISION ULTRASONIC PULSER

REFERENCE TO PROVISIONAL PATENT APPLICATION

This patent application has the benefit of the filing date of U.S. App. No. 63/580,364, filed Sep. 2, 2023, entitled "Low-Amplitude High-Precision Ultrasonic Pulser".

BACKGROUND OF THE INVENTION

Ultrasonic transducers are devices that convert energy between electrical and ultrasonic; they either create an electrical signal from ultrasonic energy or generate ultrasonic energy from an electrical signal. Most ultrasonic transducers rely on the piezoelectric effect, by which the strain of the material used in the sensor is proportional to the voltage across it. By driving the material with a large, time-varying voltage pulse, a pressure wave can be generated from the change in strain, resulting in a generated ultrasonic wave.

For nondestructive testing purposes, the transducer is coupled to the component under test so that ultrasonic vibration in the transducer produces an ultrasonic wave in the component. Wave reflections caused by defects or geometry changes cause ultrasonic energy to be returned to the transducer. This returned ultrasonic wave will generate a voltage in the transducer that can be measured. The arrival time, measured as the time difference between the excitation signal and received signal, can then be used to determine the distance of the reflector from the transducer. To generate a sufficiently large ultrasonic pressure wave, high voltages (typically of the order of 100V) are typically used. To provide good spatial resolution of the reflector's distance from the transducer, this pulse is typically applied for a short time, e.g., 10s of nanoseconds.

However, there are certain circumstances in which it is undesirable to use high voltage pulses for these measurements, in particular, when the ultrasonic system is to be operated in an environment where flammable gases or dust might be present. In those cases, the peak voltage and/or current must be limited to avoid the possibility of a fault in the system causing ignition of such gases or dust.

DETAILED DESCRIPTION OF THE INVENTION

The following description is directed to a low-amplitude high-precision ultrasonic pulser that uses a wide bandwidth excitation signal and dual transmit and receive sampling to enable pulse compression matched filtering. By using pulses that have much lower peak electrical voltages and currents than conventionally used, the pulser provides high resolution spatial measurements of ultrasonic signal reflections without sacrificing sensitivity, As explained further below, the primary method used to reduce the peak voltage and current without compromising measurement accuracy is pulse compression. The result is an excitation signal in the form of a "chirp", i.e., a pulse having a frequency that changes over time. As opposed to the short pulses conventionally used in ultrasonic testing, in which constituent frequencies are present in the pulse simultaneously, the "chirp" excitation signal has a frequency that changes over a longer duration. The frequency content of this chirp signal should be similar to that of a short pulse, but the chirp lasts longer and has a lower peak voltage than the original pulse.

The returned signal is processed by a matched filter, in which it is correlated against a copy of the transmitted signal. The arrival time of the peak signal in the output of the matched filter provides an estimate of the arrival time of the return signal. The benefit of implementing pulse compression with a frequency-varying signal is that it allows a lower maximum amplitude to be used to achieve signal-to-noise (SNR) ratios similar to a short-duration pulse. Knowledge of the ultrasonic velocity then allows an estimate of the distance of the return signal.

Overview of Pulser System

Figure 1:
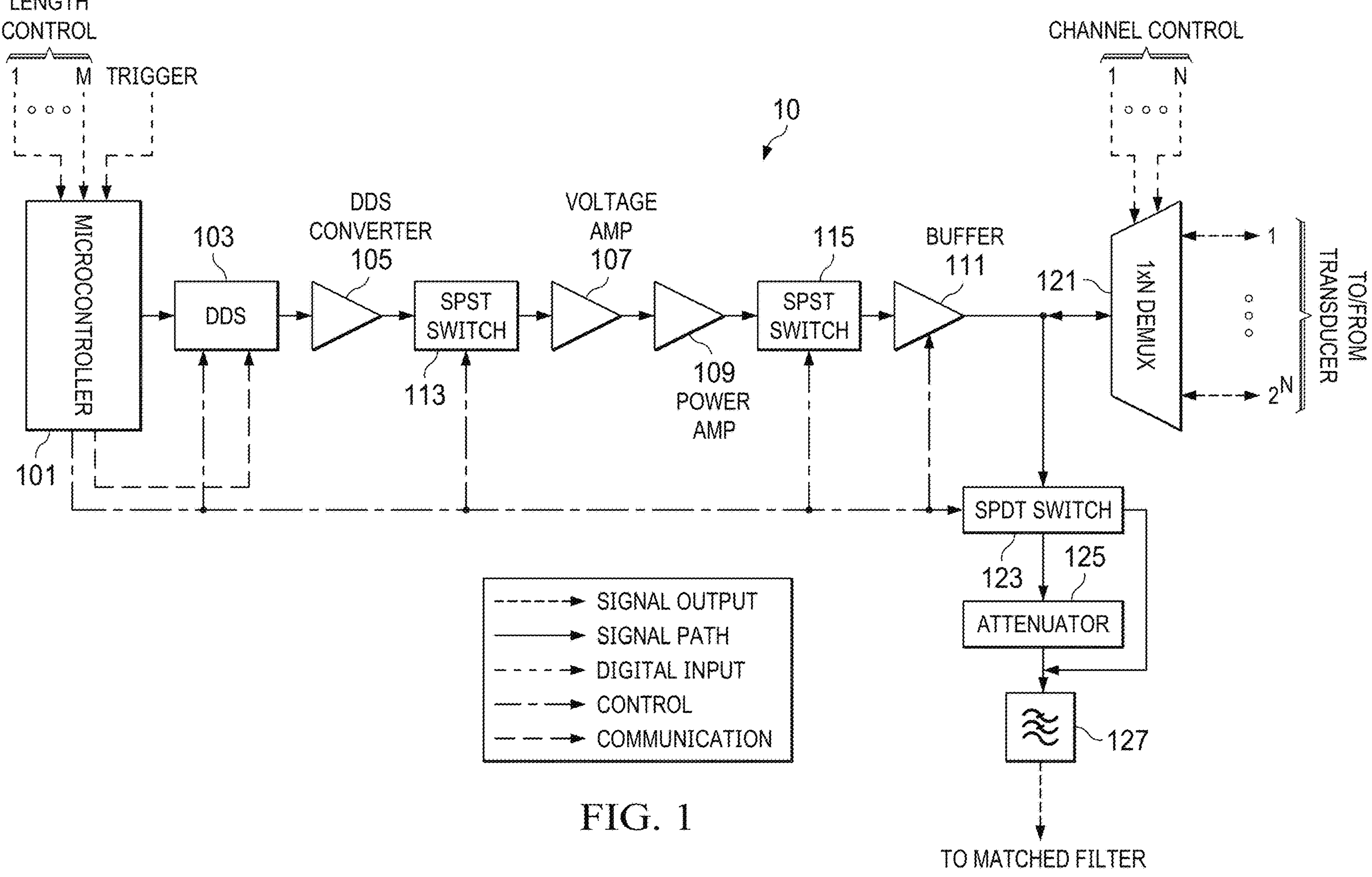
FIG. 1 illustrates a pulser in accordance with the invention for use with multiple transducers.

FIG. 1 illustrates a pulser/receiver system 10 (referred to herein as a "pulser") in accordance with the invention. As explained below, the transmit elements of pulser system 10 generate electric pulses (chirps) of controlled energy, which are converted into ultrasonic pulses when applied to an ultrasonic transducer (not shown). The receiver elements of pulser system 10 receive voltage signals from the transducer, which represent received ultrasonic pulses, and process these voltage signals for display or further processing.

A microcontroller 101 is responsible for triggering the process and controlling the signal flow through pulser system 10. It sets the length of the chirp and switches pulser system 10 between transmission and reception modes of operation.

The signal that drives pulser system 10 is a time varying frequency signal, which is first created in a direct digital synthesizer (DDS) 103. As explained below, the signal then passes through amplifiers intended to increase its voltage and current to a sufficient level to then drive an ultrasonic transducer.

In the case of multiple transducers to be driven, a demultiplexer 121 controls which ultrasonic transducer is excited.

While the signal is transmitted, it is also passed through an attenuator 125. When pulser system 10 receives a reflected signal, it is sensed on the same line; i.e., both an attenuated version of the transmitted signal and the received signal are on this line. However, during reception the attenuator 125 is bypassed to prevent unnecessary reduction of the receiving signal. Providing an attenuated version of the transmitted signal reduces the required dynamic range of the receiver digitizing circuitry.

Before the sensed attenuated transmitted signal and the unattenuated received signal is output from the pulser 10, it passes through a high-pass filter 127 to remove any low-frequency capacitive effects. The high-pass filter 127 prepares the signal before it is ultimately fed to a matched filter (not shown). The attenuated transmitted signal is used to conduct matched filtering with the rest of the received signal.

Electrical power for microcontroller 101, DDS 103, and amplifiers is provided by a voltage source (not shown) outside the pulser system 10. Multiple voltages may be provided to power each portion of the pulser system 10 separately, or a single voltage source may be regulated or converted to power the system.

Pulser System Specifics

Microcontroller 101 controls DDS 103 and the signal path through the pulser 10. It reads digital control lines, which it interprets to set the temporal length of the chirp.

When a change in the digital signals devoted to the chirp length is detected, microcontroller 101 communicates with DDS 103 so that it will generate the corresponding chirp when it is triggered.

In applications requiring multiple channels, additional digital control lines are used to set which channel the signal is sent out on. Channel digital lines are used as inputs into demultiplexer 121, placed on the end of the signal path after amplification. The number of channels and number of chirps that are available to the pulser 10 are equal to $2^n$ and $2^m$, respectively, where n is the number of digital lines devoted to setting the output channel and m is the number of digital lines devoted to setting the chirp length.

Figure 2:
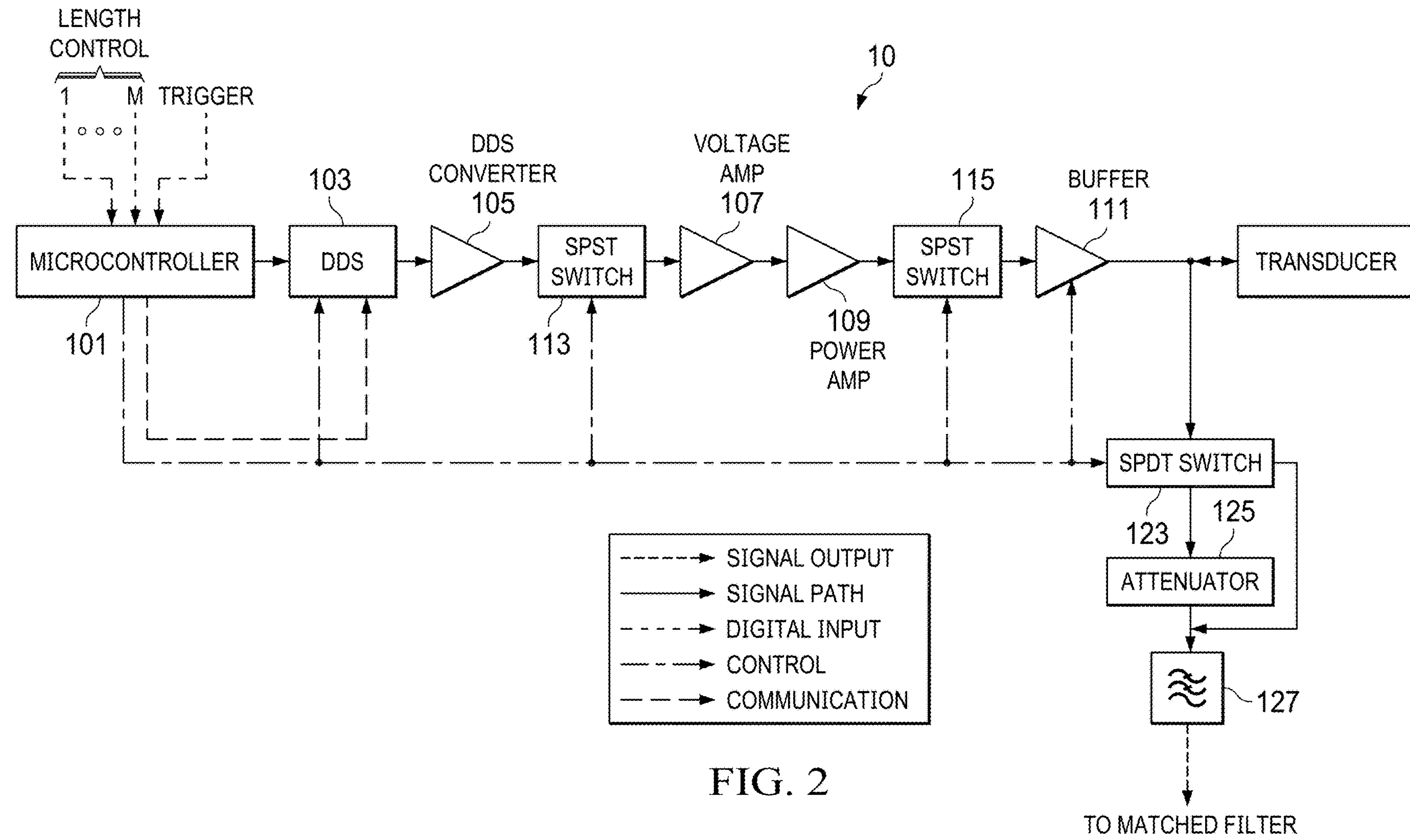
FIG. 2 illustrates the pulser for use with a single transducer.

As shown in FIG. 2, in simpler embodiments, a single transducer 20 may receive the transmit output without the need for a demultiplexer 121.

Referring to both FIGS. 1 and 2, microcontroller 101 also reads a trigger signal, which activates the process by which the chirp is generated and the response sensed. When the pulser 10 is triggered from an outside source, it closes a number of electronic switches along the signal path. The purpose of these electronic switches varies depending on their placement in the signal path and are explained below.

After receiving a trigger signal from microcontroller 101, DDS 103 generates the corresponding programed chirp. DDS 103 uses a combination of digital memory, clocking, and digital to analog (DAC) converters to create (synthesize) an analog signal from a series of digital instructions. A DDS works by outputting an analog signal level from a DAC based on the digital value provided to it. By providing different digital values in sequence, an arbitrary signal may be created from the DAC. These digital values may also be provided directly, but it is common for memory to be included within the DDS to provide a way to program and then trigger the synthesis of the arbitrary signal. An important component of the DDS is a clock, which triggers the periodic generation of the analog level from memory (or directly from digital inputs in some cases). A DDS may be used to generate a wide range of signals, including chirps of various temporal-spectral content.

The chirp output of DDS 103 is fed as input into a converter 105 to provide a single ended voltage. The exact form of the converted signal depends on the output form from DSS 103. For instance, in the case of a differential current output from the DDS 103, an op-amp subtractor circuit may be employed to convert the differential current signal into a single ended voltage signal.

The output from a DDS is typically not large enough for direct use in applications which require high-powered signals. Additionally, due to the direct synthesis from the DACs, the synthesized output will contain a stair-step quantization effect in which the signal level does not vary continuously. Conditioning the signal for use in ultrasonic applications may be accomplished by using a combination of different amplifiers.

Converter 105 may be used to both convert the output of the DDS to a usable form that can be used by other amplifiers and to filter out the higher frequency components of the synthesized signal due to the stair-stepped effect. The output from this converter/amplifier 105 is fed into a voltage amplifier 107, which is designed to increase the peak-to-peak voltage of the input signal. To drive an ultrasonic transducer, the power of the signal is also increased using a power amplifier 109, which boosts the current that may be provided to later stages. For transducer cable lengths that are on the order of the signal's wavelength, the reflection of the transmitted signal from the terminated transducer may result in distortion of the transmitted signal in the power amplifier stage. In this case, a modification to the amplifier design may use a buffer 111 between these distortions and the pre-amplified signal. This is used to reduce harmonics from distortions that occur due to these reflections, which improves the quality of the transmitted signal.

The above-described amplifier design provides a relatively constant voltage for the transmitted signal even though the effective impedance of the load (cable plus transducer) may vary strongly with frequency.

Electronic, single pole, single throw (SPST) switches 113 and 115 are placed before the voltage amplifier 107 and after the power amplifier 109 to reduce feedback during reception of the voltage signal. When the pulser 10 switches to reception mode, these switches disengage, separating buffer 111 from the signal source and amplifiers.

During transmission, the driving signal passes through demultiplexer 121 responsible for setting the channel on which the signal is generated. After passing through demultiplexer 121, the signal may be sent directly to an ultrasonic transducer or through other circuitry, such as safety circuitry.

During transmission, a shunt connection to an attenuator 125 (voltage divider) is used to attenuate the transmitted signal after it has passed through a single pole, double throw (SPDT) electronic switch 123. When microcontroller 101 switches the pulser 10 to reception mode, switch 123 toggles, bypassing the attenuator 125 and sending the received signal through the reception circuitry. This is done because the transmitted signal is many orders of magnitude larger than the received signal. By attenuating the transmitted signal first, the entire signal may be digitized while maintaining good dynamic range for the returned signal.

Before the received signal is output from the pulser 10, it is conditioned further with a high-pass filter 127. This high-pass filter 127 removes much of the low-frequency content caused by the SPDT switch 123. During reception mode, the amplification stages are isolated by disconnecting the SPST switches 113 and 115. In addition, the switch to reception mode also deactivates buffer 111, ensuring that it has a high output resistance. This is essential to not attenuate the received signal severely, as buffer 111 is able to provide high current normally, leading to a low output resistance.

As stated above, the output of pulser 10 is used as input to a matched filter (not shown), designed to receive both the attenuated transmit signal and the receive signal and to correlate the returned signal against a copy of the transmitted signal. The location of the peak of the correlation determines the time of the reflected signal.

Slight differences in when the triggering signal is registered by the microcontroller 101 can result in differences between the start of the trigger signal and the actual start of the chirp (i.e., jitter). In instances when several acquisitions are taken so that they may be averaged for an improved measurement, and digitization of the received signal is conducted relative to the triggering signal, these slight differences in timing can result in a significant degradation of the chirp signal when it is averaged, due to the peaks and valleys of each individual chirp signal destructively summing with each other. The inclusion of switches in the pulser circuitry provides a means to adjust for these differences, which in turn results in a consistent average. The transition of the pulser from receive to transmit mode before the chirp is generated results in a small signal due to the toggling of the switches. When the variance in delay of the chirp start relative to this peak is low, this switch signal can be used as a marker to compensate for jitter. Receiving circuitry or higher-level digital computing can adjust each acquired signal so that the peaks are aligned in time before the averaging operation is conducted. This ensures the received chirp signal is improved with averaging, rather than degraded due to jitter and destructive summation.

The invention claimed is:

1. A pulser system for generating and receiving ultrasonic pulses in the form of chirps, for use by an ultrasonic transducer that receives a transmit signal from the pulser in transmit mode and delivers a receive signal to the pulser in receive mode, comprising:

a transmit path having at least:

a direct digital synthesizer operable to generate a chirp signal;

a converter operable to convert the chirp signal to a transmit signal having a single ended voltage;

voltage amplifier operable to increase the voltage of the transmit signal;

a power amplifier operable to boost the current of the transmit signal;

first switch between the converter and the voltage amplifier;

second switch downstream of the power amplifier operable to deliver the transmit signal to the transducer;

wherein the first switch and the second switch are operable to shut off the transmit path during receive mode;

an attenuator operable to receive and attenuate the transmit signal;

a third switch operable to receive both the transmit signal and receive signal, to deliver the transmit signal to the attenuator when the pulser is in transmit mode, and to allow the receive signal to bypass the attenuator when the pulser is in receive mode; and a controller operable to process control signals representing the length of the chirps for use by the direct digital synthesizer, and further operable to switch the pulser between the transmit mode and the receive mode.

2. The pulser system of claim 1, further comprising a multiplexer, and wherein the pulser system generates multiple chirp signals and delivers them to the transducer via the multiplexer.

3. The pulser system of claim 1, further comprising a high pass filter that receives the transmit signal from the attenuator and the receive signal from the third switch.

4. The pulser system of claim 1, further comprising a buffer between the second switch and the transducer.

5. A method of generating and receiving ultrasonic pulses in the form of chirps, for use by an ultrasonic transducer that receives a transmit signal from the pulser in transmit mode and delivers a receive signal to the pulser in receive mode, comprising:

generating the transmit signal using a pulser system with a transmit path having at least: a direct digital synthesizer operable to generate a chirp signal; a converter operable to convert the chirp signal to a transmit signal having a single ended voltage; voltage amplifier operable to increase the voltage of the transmit signal; a power amplifier operable to boost the current of the transmit signal; first switch between the converter and the voltage amplifier; second switch downstream of the power amplifier operable to deliver the transmit signal to the transducer; wherein the first switch and the second switch are operable to shut off the transmit path during receive mode;

the pulser system further having a receive path with at least a third switch operable to receive both the transmit signal and receive signal, and an attenuator, wherein the transmit signal is delivered to the attenuator when the pulser is in transmit mode, and the third switch is used to bypass the attenuator when the pulser is in receive mode; and using a matched filter to receive both the transmit signal from the attenuator and the receive signal from the third switch, and to correlate the receive signal against a copy of the transmitted signal.

* * * * *